May 23, 1961   G. F. PITTMAN, JR., ET AL   2,985,772
SWITCHING CIRCUIT
Filed Nov. 12, 1958

WITNESSES

INVENTORS
Richard O. Decker, George F. Pittman, Jr.
and Clarence I. Jones
BY
ATTORNEY

United States Patent Office 2,985,772
Patented May 23, 1961

2,985,772
SWITCHING CIRCUIT

George F. Pittman, Jr., McCandless Township, Allegheny County, Richard O. Decker, Franklin Township, Westmoreland County, and Clarence I. Jones, Monroeville, Pa., assignors to Westinghouse Electric Corporation, East Pittsburgh, Pa., a corporation of Pennsylvania Filed Nov. 12, 1958, Ser. No. 773,500

6 Claims. (Cl. 307—88.5)

This invention relates to switching circuits in general and in particular to push-pull static switching circuit for high power and inductive applications.

It is an object of this invention to provide an improved static switching circuit.

It is another object of this invention to provide an improved switching circuit for high-efficiency switching of reversible-polarity pulse-width modulated signals.

It is still another object of this invention to provide an improved static switching circuit for high power inductive loads which may be directly coupled to the signal source, eliminating the need for coupling transformers.

A further object of this invention is to provide an improved static switching circuit which may be directly coupled to the signal source, eliminating the need for coupling transformers and which may also be equipped at the output end of the circuit with commutating diodes which enable the switching circuit to operate extremely well with inductive loads, such as generator or exciter field windings.

A still further object of this invention is to provide an improved static switching circuit operating in a push-pull fashion which has a load current feedback circuit which switches bridging transistors "on" and "off" in order to achieve a reversible polarity output with good efficiency.

Further objects of this invention will become apparent from the following description when taken in conjunction with the accompanying drawing. In said drawing, for illustrative purposes only, there is shown a preferred embodiment of the invention.

Figure 1:
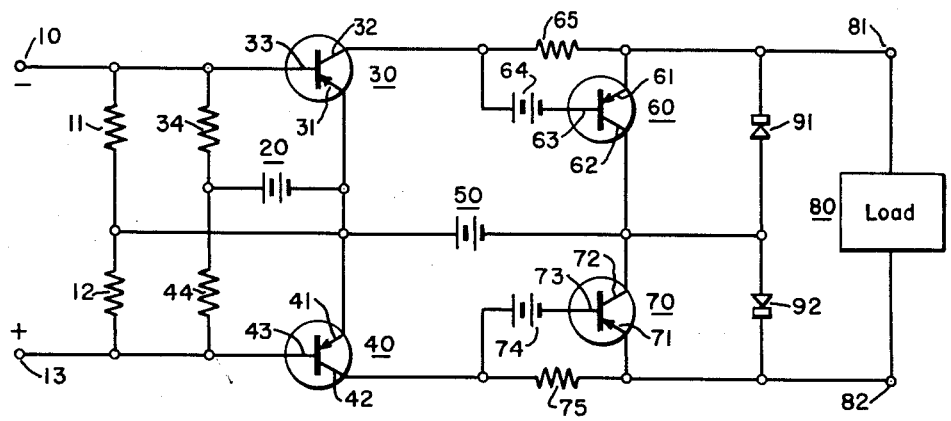
Figure 2:
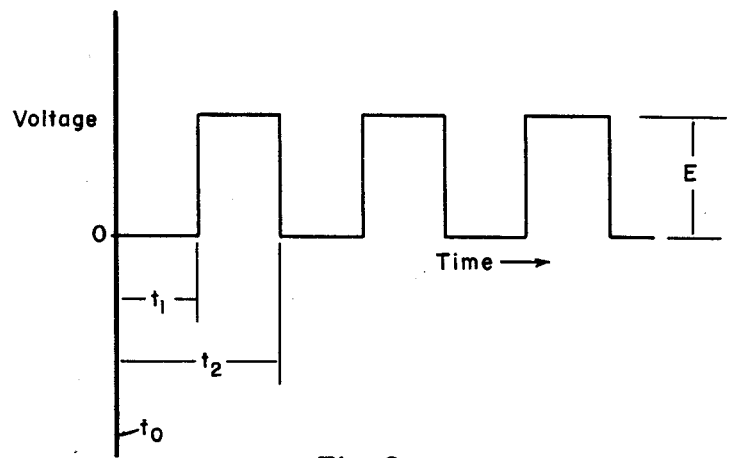

Figure 1 is a schematic diagram of a static switching circuit embodying the teachings of this invention; and Fig. 2 is a graphical representation of an input signal to be utilized with the apparatus of Fig. 1.

Referring to Fig. 1 there is illustrated a static switching circuit embodying the teachings of this invention which comprises in general transistors 30, 40, 60, and 70 connected in a bridge arrangment with a power supply voltage 50.

The transistor 30 comprises a semiconductive body having an emitter electrode 31, a collector electrode 32, and a base electrode 33. The base electrode 33 is connected to an input terminal 10. The emitter electrode 31 is connected to the positive side of this power supply 50. The collector electrode 32 is connected through a coupling resistor 65 to a load terminal 81. A bias voltage 20 and a current limiting resistor 34 are serially connected between the emitter electrode 31 and the base electrode 33.

The transistor 40 comprises a semiconductive body having an emitter electrode 41, a collector electrode 42, and a base electrode 43. The base electrode 43 is connected to an input terminal 13. The emitter electrode 41 is connected to the positive side of the power supply 50. The collector electrode 42 is connected through a coupling resistor 75 to a load terminal 82. The bias voltage 20 and a current limiting resistor 44 are serially connected between the emitter electrode 41 and the base electrode 43. The emitter electrodes 31 and 41 of the transistors 30 and 40 are connected together. An input resistor 11 and an input resistor 12 are connected between input terminals 10 and 13. The emitter electrodes 31 and 41 are connected to the junction of the input resistors 11 and 12.

The transistor 60 comprises a semiconductive body having an emitter electrode 61, a collector electrode 62, and a base electrode 63. The base electrode 63 is connected through a bias voltage 64 and the coupling resistor 65 to the emitter electrode 61. The emitter electrode 61 is connected to the load terminal 81. The collector electrode 62 is connected to the negative side of the power supply 50.

The transistor 70 comprises a semiconductive body having an emitter electrode 71, a collector electrode 72, and a base electrode 73. The base electrode 73 is connected through a bias voltage 74 and the coupling resistor 75 to the emitter electrode 71. The emitter electrode 71 is connected to the load terminal 82. The collector 72 is connected to the negative side of the power supply 50. The collectors 72 and 62 of the transistors 70 and 60 are connected.

A load 80 is connected between the terminals 81 and 82. If the load 80 is an inductive load, a pair of commutating diodes or rectifiers 91 and 92 may be connected across the load 80 in a back-to-back fashion as shown in Fig. 1. The junction of the commutating rectifiers 91 and 92 are connected to the junction of the collector electrodes 62 and 72.

The semiconductive transistor utilized in this embodiment is of the PNP type although the NPN type of transistor may be used if the bias and supply voltages are reversed in polarity. The transistors 30, 40, 60, and 70 are utilized in a switching mode. That is, they are three-electrode transistors, two of the three electrodes being connected to carry load current therethrough. A bias voltage is applied between a third and one of said two electrodes to bias the transistor to the "on" or "off" conducting state as desired. In the PNP type of three-electrode transistor used if it is desired that the load current be allowed to flow between emitter and collector electrodes then a bias voltage must be placed between the base electrode and one of the emitter and collector electrodes which renders the base electrode negative with respect to the emitter or collector electrodes. This is the "on" condition. To obtain a nonconducting or "off" state of the transistor the bias voltage as placed between the base electrode and one of the emitter or collector electrodes must be such to render the base electrode positive with respect to both the emitter and collector electrodes.

The operation of the apparatus in Fig. 1 will now be described. The transistors 30 and 40 are controlled by the signal applied to the input terminals 10 and 13 and are biased off in the absence of a signal by the biasing voltage 20 which has a polarity in accordance with the foregoing description. The transistors 60 and 70 are controlled by load current flow through the coupling resistors 65 and 75 and are biased to the fully conducting or "on" state, in the absence of load current flow, by the bias voltages 64 and 74, respectively.

Assume that a pulse-width modulated signal as shown in Fig. 2, is present at the terminals 10 and 13. The signal is a typical pulse-width modulated waveform with a constant amplitude that is greater than the magnitude of the bias voltage 20. The signal has a variable pulse-width with a time duration of $(t_2-t_1)$. During the interval of $t_1$ to $t_2$, assuming that terminal 13 is positive with respect to terminal 10, the transistor 30 becomes fully conducting and a large current from the supply voltage 50 tries to flow through the emitter-collector circuit of the transistors 30 and 60. The transistor 30 becomes fully conducting because the signal applied to the terminals 13 and 10 overcomes the bias applied by the bias voltage 20 to the transistor 30. With the polarity of input signal as assumed, the transistor 40 is biased further "off." When the large current tries to flow through the emitter-collector circuit of the transistors 30 and 60 a voltage rapidly builds up across the coupling resistor 65 which almost instantaneously exceeds the magnitude of the bias voltage 64 and is of a polarity to turn "off" the transistor 60. Load current from the supply voltage 50 then flows through the emitter-collector circuit of the transistor 30, the load 80, and the emitter-collector circuit of the transistor 70, which is already conducting, to the negative side of the supply voltage 50.

The resistors 65 and 75 may be and are normally less than 1/10 of the values of the load resistor 80. Therefore, the circuit of Fig. 1 may have an efficiency of greater than 90%. This is a tremendous increase in efficiency over circuits which use mixing resistors to obtain reversal of polarity of the output.

If the load 80 is inductive, the diodes 91 and 92 enable the circuit of Fig. 1 to operate very smoothly. The diodes 91 and 92, together with the normally conducting transistors 60 and 70 form a path thrrough which inductive currents can flow even though transistors 30 and 40 are nonconductive or "off." To illustrate, assume that the load is inductive and transistor 30 is conducting. For this mode of operation the transistor 40 is nonconducting because of the signal polarity, and the transistor 60 is nonconducting because of the voltage drop across the resistor 65. The transistor 70 is conducting because it is biased on by the bias voltage 74 and there is no load current flowing through the resistor 75.

At the time $t_2$ the transistor 30 is cut off by removal of the control signal at the terminals 10 and 13. The conducting transistor 70 and the diode 91 then provide a path through which inductive load currents will continue to flow. For the opposite mode of operation, i.e., when the transistor 40 has been conducting and is then turned off by removal of the control signal, the commutating path for the inductive load current is through the emitter-collector circuit of transistor 60 and the diode 92.

The apparatus of Fig. 1 is highly effective with all types of loads. It is very efficient in terms of power dissipation and it may be direct-coupled to the signal source. The applications of the circuit of Fig. 1 are very broad and include the control of exciter, generator, or motor fields in industrial control applications and the control of motor armatures.

In conclusion, it is pointed out that while the illustrated example constitutes a preferred embodiment of our invention, we do not limit ourselves to the exact details shown, since modification of the same may be effected without departing from the spirit and scope of this invention.

We claim as our invention:

1. A switching circuit comprising; a first pair of semiconductor transistor devices; a second pair of semiconductor transistor devices; each of said transistor devices having at least an emitter electrode, a collector electrode, and a base electrode; the emitter electrodes of said first pair connected at a first common junction; the collector electrodes of said second pair connected at a second common junction; means connecting a supply voltage between said common junctions; the collector electrode of each transistor device of said first pair being connected to an emitter electrode of a respective transistor device of said second pair; means for biasing one of said pairs normally to a conduction state; mean for biasing the other of said pairs to a normally nonconducting state.

2. A switching circuit comprising; a first pair of semiconductor transistor devices; a second pair of semiconductor transistor devices; each of said transistor devices having at least an emitter electrode, a collector electrode, and a base electrode; the emitter electrodes of said first pair connected at a first common junction; the collector electrodes of said second pair connected at a second common junction; means connecting a supply voltage between said common junctions; the collector electrode of each transistor device of said first pair being connected to an emitter electrode of a respective transistor device of said second pair; means for biasing one of said pairs normally to a conduction state; means for biasing the other of said pairs to a normally nonconducting state; circuit means for applying an input signal to said nonconducting pair which is operative to bias one transistor device of said nonconducting pair to conduction in response to an input signal.

3. A switching circuit comprising; a first pair of semiconductor transistor devices; a second pair of semiconductor transistor devices; each of said transistor devices having at least an emitter electrode, a collector electrode, and a base electrode; the emitter electrodes of said first pair connected at a first common junction; the collector electrodes of said second pair connected at a second common junction; means connecting a supply voltage between said common junctions; the collector electrode of each transistor device of said first pair being connected through a coupling means to an emitter electrode of a respective transistor device of said second pair; means for biasing one of said pairs normally to a conduction state; means for biasing the other of said pairs to a normally nonconducting state; circuit means for applying an input signal to said nonconducting pair which is operative to bias one transistor device of said nonconducting pair to conduction in response to an input signal; current flow through said transistor device of said normally nonconducting pair, in response to an input signal, and said coupling means being operative to bias one transistor device of said normally conducting pair to nonconduction.

4. A switching circuit comprising; a first pair of semiconductor transistor devices; a second pair of semiconductor transistor devices; each of said transistor devices having at least an emitter electrode, a collector electrode, and a base electrode; the emitter electrodes of said first pair connected at a first common junction; the collector electrodes of said second pair connected at a second common junction; means connecting a supply voltage between said common junctions; the collector electrode of each transistor device of said first pair being connected through a coupling means to an emitter electrode of a respective transistor device of said second pair; means for biasing one of said pairs normally to a conduction state; mean for biasing the other of said pairs to a normally nonconducting state; circuit means for applying an input signal to said nonconducting pair which is operative to bias one transistor device of said nonconducting pair to conduction in response to an input signal; current flow through said transistor device of said normally nonconducting pair, in response to an input signal, and said coupling means being operative to bias one transistor device of said normally conducting pair to nonconduction; means connecting a load across the electrodes of said normally conducting pair which are connected to the electrodes of said nonconducting pair through said coupling means.

5. A switching circuit comprising; a first pair of semiconductor transistor devices; a second pair of semiconductor transistor devices; each of said transistor devices having at least an emitter electrode, a collector electrode, and a base electrode; the emitter electrodes of said first pair connected at a first common junction; the collector electrodes of said second pair connected at a second common junction; means connecting a supply voltage between said common junctions; the collector electrode of each transistor device of said first pair being connected through a coupling means to an emitter electrode of a respective transistor device of said second pair; means for biasing one of said pairs normally to a conduction state; means for biasing the other of said pairs to a normally nonconducting state; circuit means for applying an input signal to said nonconducting pair which is operative to bias one transistor device of said nonconducting pair to conduction in response to an input signal; current flow through said transistor device of said normally nonconducting pair, in response to an input signal, and said coupling means being operative to bias one transistor device of said normally conducting pair to nonconduction; means connecting a load across the electrodes of said normally conducting pair which are connected to the electrodes of said nonconducting pair through said coupling means; a pair of commutating rectifier diodes connected in series back-to-back across said load.

6. A switching circuit comprising; a first pair of semiconductor transistor devices; a second pair of semiconductor transistor devices; each of said transistor devices having at least an emitter electrode, a collector electrode, and a base electrode; the emitter electrodes of said first pair connected at a first common junction; the collector electrodes of said second pair connected at a second common junction; means connecting a supply voltage between said common junctions; the collector electrode of each transistor device of said first pair being connected through a coupling means to an emitter electrode of a respective transistor device of said second pair; means for biasing one of said pairs normally to a conduction state; means for biasing the other of said pairs to a normally nonconducting state; circuit means for applying an input signal to said nonconducting pair which is operative to bias one transistor device of said nonconducting pair to conduction in response to an input signal; current flow through said transistor device of said normally nonconducting pair, in response to an input signal, and said coupling means being operative to bias one transistor device of said normally conducting pair to nonconduction; means connecting a load across the electrodes of said normally conducting pair which are connected to the electrodes of said nonconducting pair through said coupling means; a pair of commutating rectifier diodes connected in series back-to-back across said load; the junction of said pair of commutating diodes being connected to the common junction of said pair of normally conducting transistor devices.

References Cited in the file of this patent
UNITED STATES PATENTS

| | | |
|---|---|---|
| 2,761,917 | Aronson | Sept. 4, 1956 |
| 2,798,160 | Bruck et al. | July 2, 1957 |
| 2,835,748 | Ensink et al. | May 20, 1958 |